United States Patent [19]

Leiber

[11] Patent Number: 4,939,963
[45] Date of Patent: Jul. 10, 1990

[54] FIXTURE FOR PRECISION TURNING OF A LATERAL SURFACE

[75] Inventor: Hans-Jürgen Leiber, Tramelan, Switzerland

[73] Assignee: Kummer Freres Sa Fabrique De Machines, Tramelan, Switzerland

[21] Appl. No.: 403,988

[22] Filed: Sep. 7, 1989

Related U.S. Application Data

[63] Continuation of Ser. No. 176,277, Mar. 31, 1988, abandoned.

[30] Foreign Application Priority Data

Apr. 16, 1987 [CH] Switzerland ................. 1502/87

[51] Int. Cl.⁵ .................................................. B23B 5/00
[52] U.S. Cl. ............................................. 82/19; 82/13
[58] Field of Search ................ 82/18, 19, 11, 11.1, 82/11.3, 13

[56] References Cited

U.S. PATENT DOCUMENTS

| | | | |
|---|---|---|---|
| 3,688,612 | 9/1972 | Haruta | 82/19 |
| 3,803,956 | 4/1974 | Scaduto | 82/19 |
| 3,813,969 | 6/1974 | Wheeler | 82/19 |
| 4,479,292 | 10/1984 | Wheeler | 82/19 |
| 4,505,627 | 3/1985 | Wheeler | 82/19 |
| 4,584,915 | 4/1986 | Ichiyanagi | 82/19 |
| 4,584,916 | 4/1986 | Inoue | 82/19 |
| 4,624,159 | 11/1986 | Kumer et al. | 82/19 |
| 4,646,595 | 3/1987 | Slee | 82/19 |
| 4,646,596 | 3/1987 | Edwards et al. | 82/19 |
| 4,671,146 | 6/1987 | Wheeler | 82/19 |
| 4,679,472 | 7/1987 | Feller et al. | 82/19 |

FOREIGN PATENT DOCUMENTS

| | | | |
|---|---|---|---|
| 1105042 | 4/1961 | Fed. Rep. of Germany | 82/19 |
| 2427826 | 1/1976 | Fed. Rep. of Germany | 82/19 |
| 59-126148 | 7/1984 | Japan | 82/19 |
| 61-214901 | 9/1986 | Japan | 82/19 |

Primary Examiner—Frederick R. Schmidt
Assistant Examiner—Blynn Shideler
Attorney, Agent, or Firm—Oliff & Berridge

[57] ABSTRACT

For high-precision material-removing machining of the lateral surface of a workpiece (1) rotating with the main spindle (3) of a turning lathe, a cutting tool (17) is fixed on a slide (14) which carries out an axial movement synchronized with the rotation of the main spindle by means of a cam assembly (18, 21, 20) control. The shaft (21) of the cam assembly is rotation-tightly coupled to the main spindle by electric means (8, 10).

9 Claims, 6 Drawing Sheets

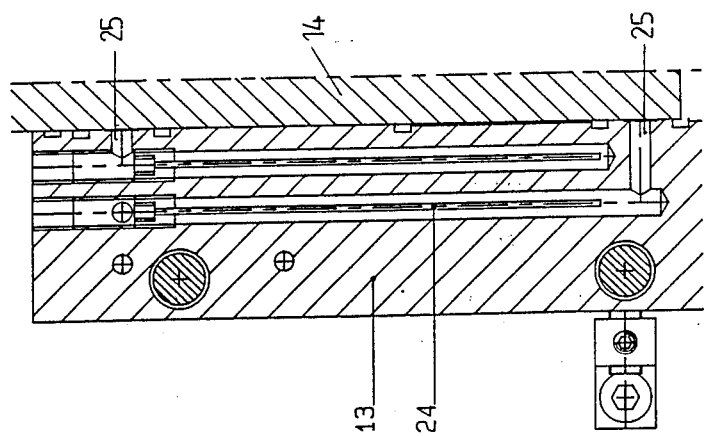
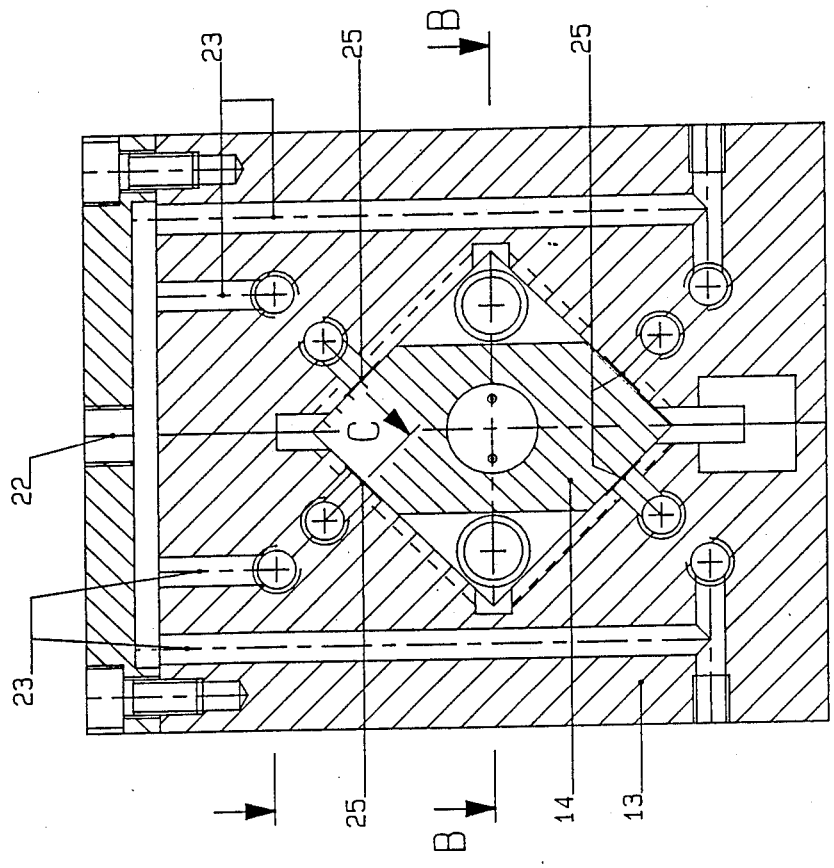

FIXTURE FOR PRECISION TURNING OF A LATERAL SURFACE

This is a continuation of application Ser. No. 07/176,277 filed Mar. 31, 1988 now abandoned.

This invention relates to machining apparatus, and more particularly to a fixture for attachment to a cross-slide of a turning lathe for the purpose of high-precision material-detaching machining of a lateral surface and of a contiguous shoulder having a specific course of curvature on a workpiece, consisting essentially of a base body in which a slide is axially movably supported, a tool carrier which is secured to the end of the slide projecting from the base body and in which at least one turning tool is chucked, a feeler roll affixed to the other end of the slide and via which the slide is held by pressing means in contact with the radial cam determining the course of curvature, a shaft rotatably supported in the base body and bearing the radial cam, and of rotary drive means fixed to this shaft.

Workpieces processed by means of the machining unit according to this invention are, for instance, tape drums for VCRs and DATs. The latter will presumably be manufactured in large quantities in the next few years, hence the requirement for machining fixtures of the type initially mentioned for producing the tape drums will also increase.

A simplified elevation of such a tape drum is shown in FIG. 1 and designated by reference numeral 1; FIG. 1A is a greatly enlarged partial radial section taken in the area A of FIG. 1.

Fixtures for machining such workpieces have long been known in the art. Ever more exacting requirements as regards the precision of dimensions and shape, as well as the surface quality of these workpieces, necessitated the development of a new fixture such as is described in U.S. Pat. No. 4,624,159. Although this fixture satisfies the high-precision requirements, the machining rate is limited inasmuch as the speed cannot be increased much over 500 rpm. The reason for this is the relatively great mass of the rotor and its not completely avoidable imbalance owing to the two machining tools.

It is an object of this invention to provide an improved machining fixture for turning lathes which not only meets the accuracy requirements for the workpieces to be machined but also makes possible a considerably higher machining speed.

To this end, in the fixture according to the present invention, of the type initially mentioned, the drive means are connected to the main spindle bearing the workpiece by means of an appropriate control of the "autosyn" type in such a way that the speed of rotation of the radial cam is synchronized with, i.e., is the same, generally constant speed of rotation as, that of the main spindle, and the relative angular positions of both can be brought to any desired fixed value.

A preferred embodiment of the invention will now be described in detail with reference to FIGS. 2-6 of the accompanying drawings, in which.

Figure 2:
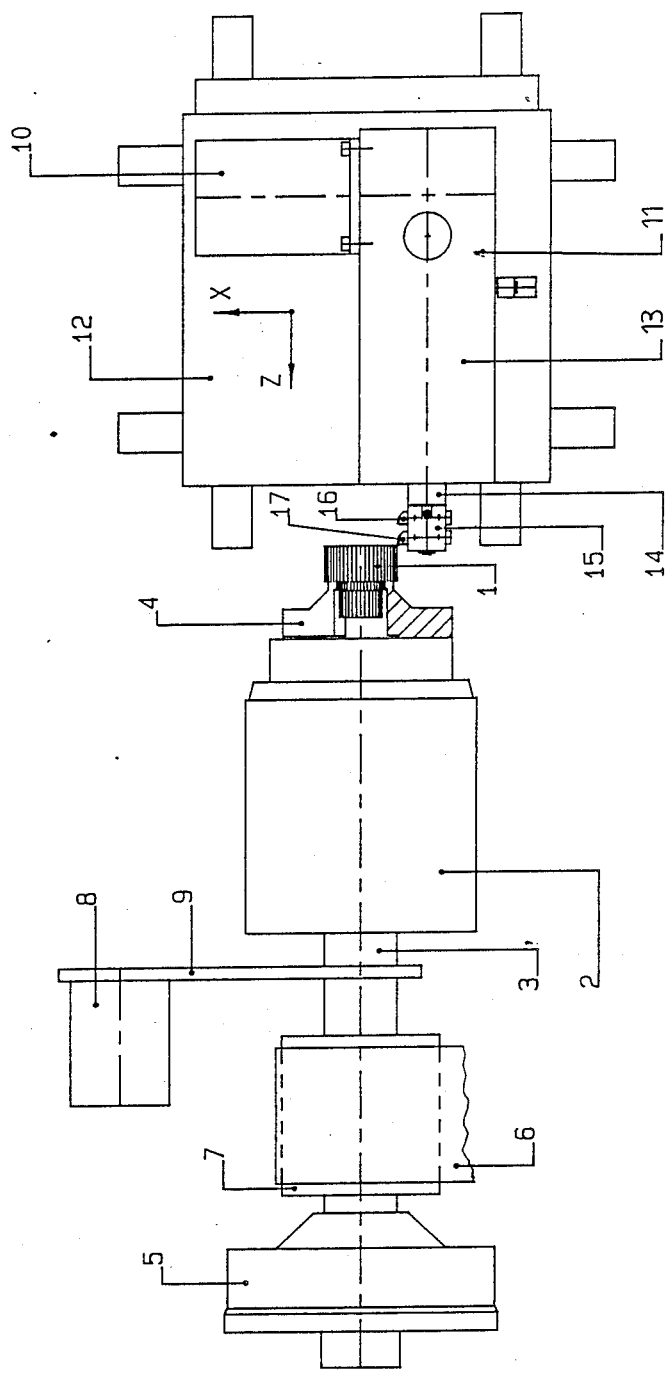
Figure 3:
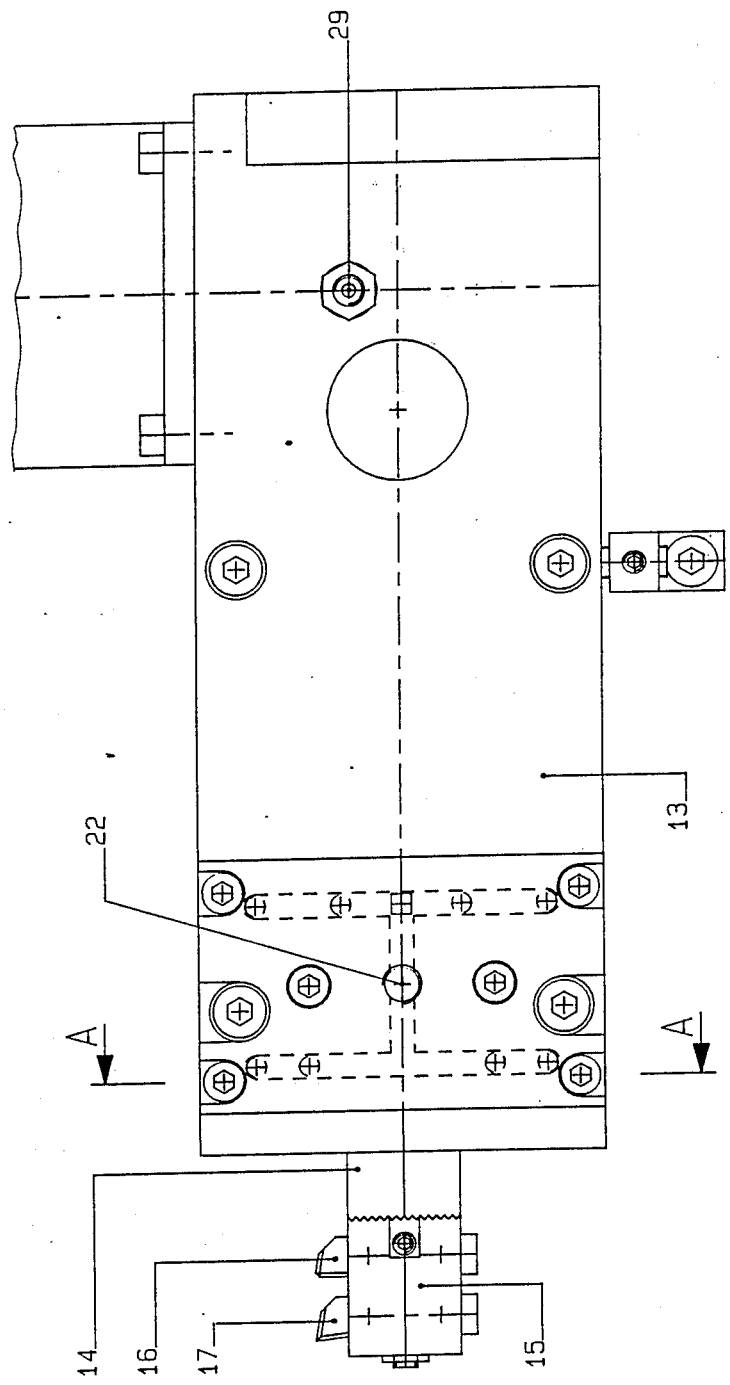
Figure 4:
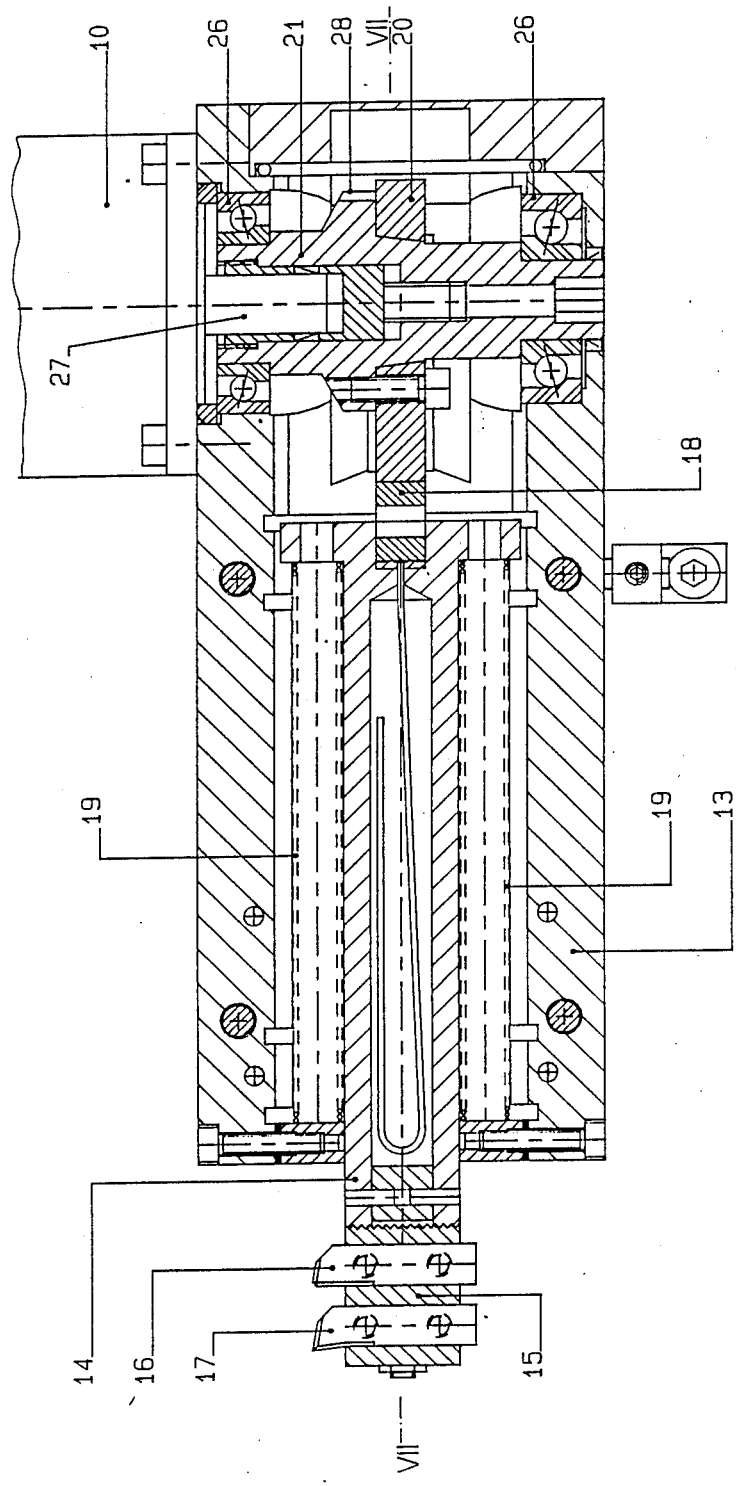
Figure 7:
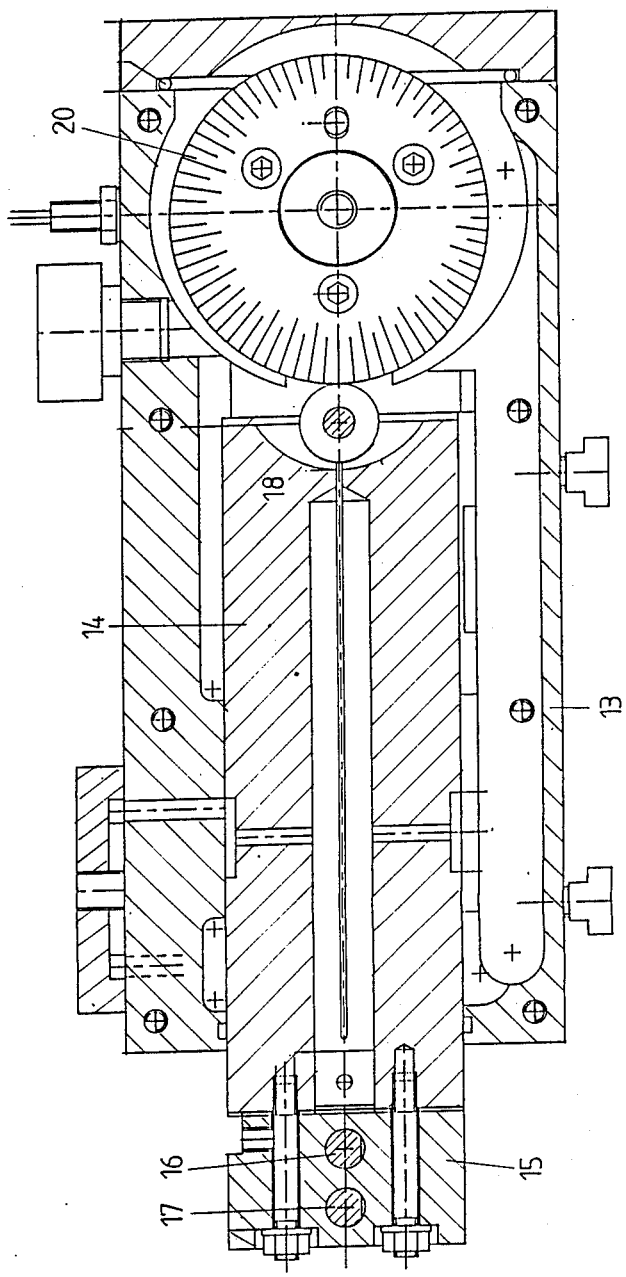

FIG. 2 is a diagrammatic top plan view of a turning machine equipped with a fixture according to an embodiment of the invention, FIG. 3 is a top plan view of the fixture, FIG. 4 is a longitudinal section taken on the line B—B of FIG. 5, FIG. 5 is a cross-section taken on the line A—A of FIG. 3, FIG. 6 is a partial longitudinal section taken on the line C—C of FIG. 5, and FIG. 7 is a section taken on the line VII—VII of FIG. 4.

The lathe depicted in FIGS. 2-6 has a headstock 2 in which there is a main spindle 3 having a chuck 4 operated by a cocking cylinder 5. Main spindle 3 is driven rotatingly by an electric motor (not shown) which is drivingly connected thereto by a belt drive having a belt 6 and by a pulley 7 mounted on spindle 3. Also drivingly connected to main spindle 3 by a toothed belt 9 is an incremental shaft encoder 8 which acts as a pulse transmitter for a drive motor 10 of the machining fixture, designated as a whole by reference numeral 11.

Fixture 11 is secured to a cross-slide 12 of the turning lathe so that it can be moved in and out of operating position by means of cross-slide 12. Secured to cross-slide 12, fixture 11 comprises a base body 13 in which a slide 14 is mounted, preferably hydrostatically, for longitudinal movement. The oil line for the hydrostatic bearing is connected at a threaded bore 22, and the oil flows through bores 23 and capillary tubes 24 to bearing chambers 25 (FIGS. 5 and 6).

Screwed to the end of slide 14 projecting from base body 13 is a vertically adjustable tool carrier 15 in which two turning tools 16 and 17 are fixed. At the other end of slide 14 is a semicylindrical recess in which a feeler roll 18 is supported, preferably hydrostatically balanced.

By means of pressing means 19 and via feeler roll 18, slide 14 is held in contact with a radial cam 20. The profile of cam 20 is an exact copy of the profile of a shoulder 1a to be produced on workpiece 1. Cam 20 is rotatingly mounted in base body 13 on a shaft 21 by means of bearings 26. One end of shaft 21 is designed as a force-locking shaft-hub connection in which a drive shaft 27 of motor 10 is fixed. In this embodiment, motor 10 is a stepping motor having a step count per revolution conforming to the number of pulses per revolution of shaft encoder 8, its speed of rotation being determined by this encoder, drivingly connected to main spindle 3, via a suitable drive-pulse unit, so that the speed of rotation of radial cam 20 is exactly synchronized with that of main spindle 3.

A DC motor or polyphase induction motor equipped with a shaft encoder might also enter into consideration as the drive for cam 20; such a motor would then likewise rotate cam 20 synchronously with spindle 3 by means of a suitable control.

A narrow groove 28 in shaft 21 breaks the contact between shaft 21 and a proximity switch 29 in a precisely determined angular position. Thus one reference signal is produced per revolution of cam 20, and incremental shaft encoder 8 also transmits one reference signal per revolution in a specific angular position.

Figure 1:
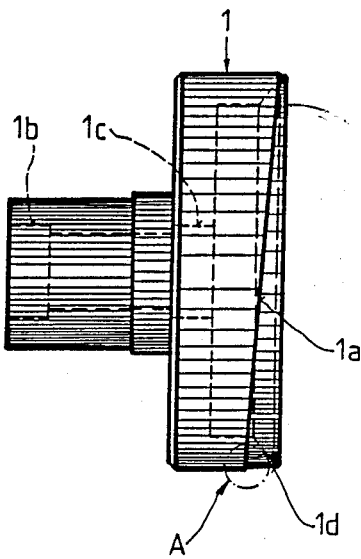
FIG. 1 is an elevation of the tape drum to be machined.
Figure 1A:
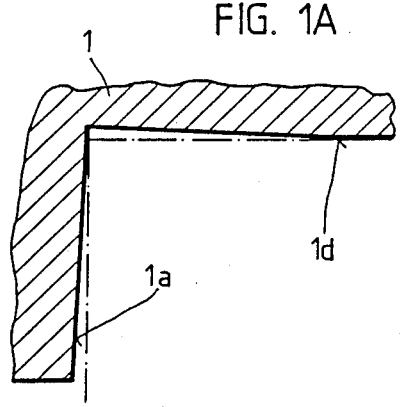
FIG. 1A is a detail corresponding to "A" of FIG. 1 on a larger scale.

The machining fixture described above operates as follows:

After particularly bores 1b and 1c of the workpiece 1 held in chuck 4 have been machined, machining fixture 11 is brought into operating position by means of cross-slide 12. The speed of rotation of main spindle 3 is braked down, and drive motor 10 of fixture 11 rotates cam 20 into its reference position. If its reference signal now passes through shaft encoder 8, drive motor 10 is switched on and begins to rotate synchronously with main spindle 3 as regards both angle and speed of rotation. The speed of rotation of spindle 3 is now accelerated up to the machining speed, with motor 10 following. By means of cross-slide 12, fixture 11 now undergoes a horizontal feed movement, and tool 17 first machines the lateral surface 1d of workpiece 1. At this time, shoulder 1a is already pre-fabricated inasmuch as slide 14, to which tool 17 is secured by means of tool carrier 15, follows the profile of cam 20 under the influence of springs 19 and is thus axially reciprocated during each rotation. As soon as machining of lateral surface 1d is terminated, tool 17 is lifted by a vertical movement of cross-slide 12, which then advances horizontally and puts tool 16, projecting opposite tool 17, into its operating position. Shoulder 1a and the adjacent portion of lateral surface 1d (FIG. 1A) are then finished in a simple recessing operation by a vertical displacement of cross-slide 12. As soon as this finishing operation is terminated, cross-slide 12 returns to its starting position so that the finished workpiece 1 may then be released from chuck 4.

Owing to the small reciprocated mass of tool carrier 15 and slide 14, as well as the latter's hydrostatic bearings, speeds of rotation of app. 1000 rpm are achieved for the machining of lateral surface 1d and shoulder 1a, with excellent quality of the finished workpieces; this is double the speed achieved with the prior art means. Owing to the hydrostatically supported feeler roll 18, there is also virtually no wear and tear in the bearing chamber, and optimum lubrication takes place between feeler roll 18 and radial cam 20. Moreover, since there is no mechanical connection between machining fixture 11 and main spindle 3, cross-slide 12 can move unhindered throughout its operating area, and speeds of rotation of more than 6000 rpm can be used for spindle 3 in producing bores 1b and 1c. All this contributes to the fact that tape drums for VCRs and DAT recorders can be produced much more efficiently with the machining fixture according to the present invention.

What is claimed is:

1. A device for high precision machining of circular surfaces on a workpiece rotatively driven in a lathe, comprising
    a spindle having an axis and means for holding said workpiece secured to said spindle and for driving it in rotation about said axis;
    a cross-slide mounted at a front end of said spindle; and
    a tool fixture on said cross-slide, said tool fixture comprising:
        a slide having a forward end and a rear end, and guiding means for guiding said slide in a direction parallel to said axis,
        a tool carrier secured to said forward end,
        a secondary shaft borne by said tool fixture and extending perpendicularly to said axis at said rear end, and
        a radial cam secured to said secondary shaft, and a reciprocating means for providing a reciprocating movement of said slide in said fixture in response to a rotating movement of said cam,
        wherein electrical coupling means are provided for coupling rotation of said secondary shaft and said spindle when the tool carrier is positioned in a machining position with respect to the workpiece.

2. A device according to claim 1 wherein said guiding means comprise a hydrostatic bearing means for permitting displacement of said slide parallel to said axis against a lateral force perpendicular to said movement.

3. A device according to claim 2 wherein said fixture comprises a body with an inner chamber; said slide, secondary shaft cam and reciprocating means being located within said chamber, said chamber being further filled with a hydrostatic fluid.

4. A device according to claim 3 wherein said fixture further comprises a feeler roll hydrostatically balanced and located within said chamber, said feeler roll being simultaneously in contact with said cam and said rear end of the slide.

5. The device of claim 1, further comprising a shaft encoder rotatingly connected to said spindle and transmitting one reference signal per revolution of said spindle.

6. The device of claim 1, further comprising hydrostatic bearing means for said slide.

7. The device of claim 1, wherein said electrical coupling means comprise a shaft encoder connected to said spindle, an electric motor capable of driving said secondary shaft, and control means capable of transmitting control signals from said shaft encoder to said motor.

8. The device of claim 7, wherein said motor is a stepping motor.

9. A fixture for attachment to the cross-slide of a turning lathe for the purpose of high-precision material detaching machining of a lateral surface and of a contiguous shoulder having a specfic course of curvature on a workpiece borne by the main spindle of the lathe, comprising:
    a base body,
    a shaft rotatingly mounted in said base body,
    a radial cam borne by said shaft for determining said course of curvature,
    a slide movable axially in said base body and having one end projecting from said base body,
    a tool carrier secured to said one end of said slide,
    a feeler roll affixed to the other end of said slide,
    pressing means holding said slide in contact with said radial cam via said feeler roll,
    rotary drive means fixed to said shaft, and
    control means comprising a first arrangement associated with said main spindle, a second arrangement associated with said rotary drive means and an electrical connection between said arrangements, said control means synchronizing the speed of rotation of said radial cam with the speed of rotation of said main spindle during machining of the workpiece.

* * * * *